April 9, 1963 L. S. RAY 3,084,594
OPAQUE PROJECTION APPARATUS
Filed May 5, 1961
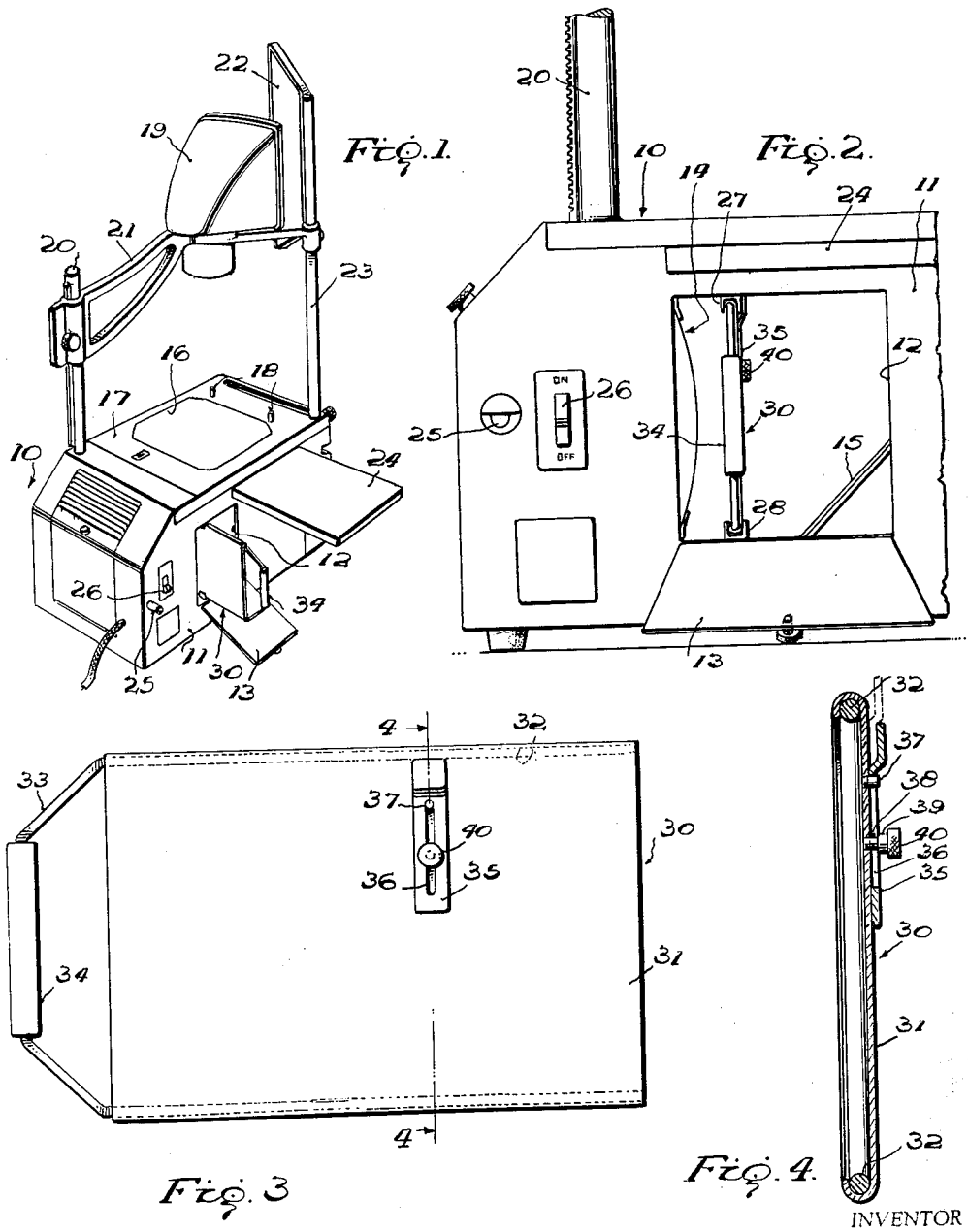
INVENTOR
*Leonard S. Ray*
BY *W. J. Eccleston,*
ATTORNEY 3,084,594
OPAQUE PROJECTION APPARATUS
Leonard S. Ray, 606 Chaplin St. SE., Washington, D.C.
Filed May 5, 1961, Ser. No. 108,208
1 Claim. (Cl. 88—26)
(Granted under Title 35, U.S. Code (1952), sec. 266)

The invention described herein may be manufactured and used by or for the Government for governmental purposes, without the payment to me of any royalty thereon.

The invention relates to projectors for slides of the type which include a housing which mounts therein a light source and a forwardly spaced lens system through which light rays are projected. A popular type of such projector is the so-called rear view projector wherein the same is located in a projection room behind a translucent screen and projects a picture in a well known manner unto the rear of such screen for viewing by an audience in an auditorium in front of the screen. Although the invention as disclosed is particularly adapted to a rear view projector, it is not considered to be so limited except as hereinafter claimed.

In using a rear view projector, the lecturer furnishes the projector operator with a group of slides which are arranged in a desired order and which are successively projected upon the screen in response to signals from the lecturer. Such slides are usually too large for use in the slide magazines commonly used in connection with 35 millimeter and like slides. Hence, each change of a slide inevitably results in a glare of light on the screen as the operator withdraws one slide and places another in position. Lecturers have attempted to eliminate this objectionable feature by having the operator turn off the light source at each slide change. However, such constant turning on and off of the light shortens the life of the light and, more importantly, causes the slide operator to work in the dark.

With the foregoing in view, it is an object of the invention to provide improved means for readily darkening the screen during slide changes without turning off the light source of the projector.

A further object is to provide an improved shutter which is readily applied to conventional projectors and which may be interposed between the light source and lens system of the projector during slide changes.

A further object is to provide in an improved shutter as last described improved stop means for limiting movement of shutter to an open position.

A further object is to provide in a shutter for a slide projector, means whereby the light from the light source is furnished to the operator during slide changes even though such light is blocked from the screen.

Other objects and advantages reside in the specific structure of the invention, the structure of the several elements thereof, combinations and subcombinations of such elements with each other and/or with a slide projector, all of which will be readily apparent to those skilled in the art upon reference to the attached drawing which illustrates one embodiment of the invention and to the following specification wherein the invention is described and claimed.

In the drawing:

FIGURE 1 is a perspective view of a slide projector to which the invention has been applied, the shutter being shown in the partially withdrawn position;

FIGURE 2 is an enlarged fragmentary side elevational view of the housing of a slide projector, the shutter being shown in end elevation;

FIGURE 3 is a further enlarged front elevational view of the shutter apart from the projector; and FIGURE 4 is a vertical sectional view taken substantially on the plane of the line 4—4 of FIGURE 3.

Referring specifically to the drawing wherein like reference characters designate like parts in all views, 10 generally designates a slide projector housing of any conventional form which includes an opaque side wall 11 which is formed with an access opening 12 therethrough which may be closed by any suitable closure such as the hinged door 13. Any suitable light source, not shown, is housed in the rear of the projector housing 10 and projects light rays forwardly through a condenser lens 14, FIGURE 2. Such light rays normally are deflected upwardly by a mirror or prism 15 or the like through an opening 16 in the top wall 17 of the housing 10. A slide, not shown, to be projected is laid across the opening 16 and correctly positioned thereover by any suitable means such as the locator pins 18 which project upwardly of the top wall 17 at one or more sides of the opening 16. The mirror 15 forms part of the lens system of the projector. The remaining elements of the lens system are housed in a casing 19 which is supported on housing 10 for lateral and vertical adjustment by a standard 20 and by any suitable bracket 21. Normally the projected picture is projected forwardly of casing 19 onto the viewing screen, not shown. However, in the embodiment illustrated, it is projected laterally by a mirror 22 which is mounted on housing 10 by a removable and/or adjustable standard 23.

Housing 10 may be provided with a shelf 24 for supporting a stack of slides. It also, may have a reading light 25 for the operator in proximity to the opening 12 and which may be controlled by any conventional switch 26. Such light is convenient to permit the operator to read any instructions which may have been furnished by the lecturer and/or to permit him to identify individual slides prior to mounting the same for projection.

The shutter according to the invention is slidably mounted in upper and lower slideways 27 and 28 which are secured across the interior of the housing 10 in alignment with the access opening 12 between the condenser lens 14 and the mirror 15. The slideways 27 and 28 may comprise length of channel material as shown in FIGURE 2 and may be secured in position in any suitable manner by any suitable means, not shown. The shutter itself is generally designated at 30 and may comprise a sheet 31 of any suitable opaque material such as sheet metal. The upper and lower edges of the sheet 31 may be rolled about a stiffening wire 32 to impart the necessary rigidity to the sheet 31. The wire 32 includes an integral bight 33 which projects beyond one end edge of sheet 31 to provide a handle for sliding the shutter back and forth. If desired, the bight 33 may have a finger grip 34 of insulating material applied thereto to protect the fingers against heat from the light source which may be transmitted by conduction from the metal of the sheet 31 and wire 32. As shown the handle 33 is formed on that end of the shutter 30 which is adjacent the access opening 12.

As so far described, it is apparent that with the access door open, the shutter 30 may be freely slid back and forth in front of the condenser lens in the slideways 27 and 28. However, it is desirable to provide means to prevent the shutter 30 from being entirely withdrawn from the slideways each time it is withdrawn. With this in view, an adjustable stop 35 has been provided. This stop may comprise a metal or the like strip formed with a vertical slot 36 therein for a pin 37 fixed to the sheet 31 and a locking screw 38 which is threaded in the sheet 31 in downwardly spaced relation to the fixed pin 37. The fixed pin 37 comprises a limit stop to limit downward movement of the stop 35 to the solid line position of FIGURES 3 and 4 wherein the upper end of the stop is below the upper edge of the shutter so that the latter may be inserted into the slideways 27 and 28 or removed therefrom. However, once the shutter 30 has been inserted into the housing 10 as aforesaid, the stop 35 is raised to the broken line position of FIGURE 4 wherein it projects above the upper edge of the access opening 12 so as to prevent complete withdrawal of the shutter but permits the latter to be withdrawn sufficiently to clear the condenser lens 14. The stop 35 is secured in this operative position by tightening the screw 38 until a shoulder 39 on the stem thereof bears on the stop 35 outwardly of the slot 36. A knob 40 on the outer end of the screw 38 facilitates this operation. Obviously, if it is desired to remove the shutter entirely, the operation is reversed to permit the stop 35 to be lowered to the inoperative position.

It is apparent from the foregoing, that the shutter 30 may be quickly operated with one hand while the operator removes and replaces a slide with the other. This temporary blacking out of the screen lends a professional touch to the operation of the machine and takes no longer to change a slide than did the method of the prior art. Also, it is obvious that the same may be added to conventional projecting machines with but a slight modification thereof, which modification can be accomplished by any tinsmith or other person skilled in sheet metal work.

Moreover, while there has been shown and described what is now thought to be the preferred embodiment of the invention, it should be understood that the same is susceptible of other forms and expressions. Consequently, the invention is not considered to be limited to the precise structure shown and described hereinabove but only as hereinafter claimed.

I claim:

A slide projector comprising a housing including a floor, top wall, opposed side walls as well as front and rear walls, a light source in said housing adjacent said rear wall, a condenser lens in said housing forwardly of said light source, one of said side walls being formed with an access opening therethrough forwardly of said condenser lens, vertically spaced and aligned horizontal slideways carried by said top wall and said floor forwardly of said condenser lens and in alignment with said access opening, a shutter slidable in said slideways through said access opening from an operative position inside said housing wherein it prevents the passage of light from said source to a withdrawn position at least partially outside said housing wherein passage of light is permitted, a slidable stop mounted on said shutter, said stop being slidable to a projected position wherein it engages said last named side wall of said housing to limit movement of said shutter in one direction to said withdrawn position, means for readily releasably locking said stop in said projected position, said stop being movable to a retracted position permitting the removal of said slidable shutter from said housing through said access opening, said top wall having a top wall opening formed therein forwardly of said shutter, means for mounting a slide on said top wall across said top wall opening, a mirror in said housing forwardly of said shutter, said mirror being inclined to project light from said source upwardly through said top wall opening, a lens system for projecting light passing through said top wall opening, and means mounting said lens system on said housing in upwardly spaced and aligned relation to said top wall opening.

References Cited in the file of this patent

UNITED STATES PATENTS

| | | |
|---|---|---|
| 720,099 | Barbour | Feb. 10, 1903 |
| 1,891,473 | Goldberg | June 7, 1929 |
| 2,303,920 | Drucker | Dec. 1, 1942 |
| 2,463,026 | Field | Mar. 1, 1949 |
| 2,835,166 | Pollan | May 20, 1958 |

FOREIGN PATENTS

| | | |
|---|---|---|
| 64,444 | France | June 8, 1955 |